United States Patent [19]
Ludolph

[11] Patent Number: 5,874,958
[45] Date of Patent: Feb. 23, 1999

[54] METHOD AND APPARATUS FOR ACCESSING INFORMATION AND ITEMS ACROSS WORKSPACES

[75] Inventor: Frank Ludolph, Menlo Park, Calif.

[73] Assignee: Sun Microsystems, Inc., Palo Alto, Calif.

[21] Appl. No.: 829,676

[22] Filed: Mar. 31, 1997

[51] Int. Cl.[6] ........................................ G06F 3/14
[52] U.S. Cl. .................... 345/339; 345/340; 345/347
[58] Field of Search .................. 345/339, 332, 345/333, 334, 340, 341, 343, 345, 346, 347, 357, 350

[56] References Cited

U.S. PATENT DOCUMENTS

| | | | |
|---|---|---|---|
| 5,140,678 | 8/1992 | Torres .................................... | 345/350 |
| 5,233,687 | 8/1993 | Henderson, Jr. et al. ............. | 345/346 |
| 5,293,470 | 3/1994 | Birch et al. ............................ | 345/435 |
| 5,305,435 | 4/1994 | Bronson ................................. | 345/351 |
| 5,347,295 | 9/1994 | Agulnic et al. ........................ | 345/156 |
| 5,394,521 | 2/1995 | Henderson, Jr. et al. ............. | 345/346 |
| 5,488,686 | 1/1996 | Murphy et al. ........................ | 345/330 |
| 5,657,049 | 8/1997 | Ludolph et al. ....................... | 345/145 |
| 5,673,404 | 9/1997 | Cousins et al. ........................ | 345/347 |
| 5,745,096 | 4/1998 | Ludolph et al. ....................... | 345/340 |

*Primary Examiner*—Raymond J. Bayerl
*Assistant Examiner*—X. Lucka Bautista
*Attorney, Agent, or Firm*—Hecker & Harriman

[57] ABSTRACT

A sliding panel configured along an edge of a GUI is associated with an application. When a panel activation event occurs, the panel slides into view, allowing the user to view the information generated by the application and to interact with the configured application. The panel automatically closes when a panel deactivation event occurs. Multiple panels can be attached to each edge of the GUI. The GUI is maintained such that the GUI representation of the sliding panel is always visible and accessible in a first portion of the GUI. A second portion of the GUI can be used to display workspace output. The content of the first portion of the GUI remains constant as a user switches from one workspace to another. The content of the first portion of the GUI therefore remains accessible from any workspace.

23 Claims, 15 Drawing Sheets

METHOD AND APPARATUS FOR ACCESSING INFORMATION AND ITEMS ACROSS WORKSPACES

BACKGROUND OF THE INVENTION

1. Field of the Invention

This invention relates to accessing information and other items across multiple workspaces in a GUI.

2. Background Art

In computer systems, a GUI is used to present information to a user. In a personal computer environment, analogies are made between the items in a GUI and a person's desk. For example, the initial screen that is displayed when a computer system is booted is typically referred to as a desktop. The desktop provides a mechanism for displaying application information within the application's windows. Because a window is associated with an application, the information contained in an application window is not accessible from another application. Further, the information is not accessible across multiple desktops.

Some user environments such as the Unix Common Desktop Environment (CDE) and Hewlett Packard's HP Views provide users with multiple workspaces or desktops. The CDE and HP Views environments provide a panel displayed in the GUI that includes a set of buttons that provide access to applications such as calendar, file manager, mail, printer, etc. The user can access the panel while in one of the workspaces to invoke one of the identified applications. However, a window of the invoked application is, by default, only accessible in the workspace in which the user invoked the application. If the user subsequently switches to another workspace, the user must switch back to the workspace in which the application was invoked to access the information associated with the application.

A mechanism is available in the CDE and HP Views environments for the user to override the default to make a window accessible in multiple workspaces. However, it is a manual process. The user must identify a window and the individual workspaces in which the window is to be accessible. Thus, the user must go through a tedious, manual process to make a window accessible in another workspace.

Further, the CDE and HP Views environments do not provide any management of the GUI to ensure that the panel or the application window(s) do not become inaccessible. A desktop can easily get cluttered with open application windows and other GUI elements. For example, the user can initiate an application that opens one or more windows. The application windows overlay the information already being displayed on the desktop. In the CDE and HP Views environments, newly created application windows overlay the panel, application windows or other GUI elements already on the desktop making them inaccessible. To access the panel or other GUI element that is no longer visible on the desktop, the user must first rearrange the elements on the desktop to uncover the covered element.

Various techniques have been developed to make an element accessible. For example, in a process referred to as minimization, the size of a window can be reduced. A window can be minimized to the point that it is represented as an icon on the desktop, for example. A window can also be removed by closing it. Further, an element can be rearranged on the desktop. Windows can be dragged from one location on the desktop to another, for example. The shuffling or resizing of elements on the desktop is time consuming. It can also be frustrating to the user particularly when the user needs access to the element frequently or quickly.

Menus (such pop-up or pull-down menus) have also been used to make elements more accessible. The user clicks on a menu icon which causes the menu to be displayed. The user can click on an item in the menu to select the item. These menus are pre-configured and their entries act as pointers to such things as applications, folders or documents. In the Macintosh operating system, an apple icon in the top left-hand corner of the screen represents a menu that contains pointers to elements. To add an entry in the apple menu display, the user adds the element to an "Apple Menu Items" folder in the system's folder.

Another type of menu that is used in Windows 95 is a taskbar that exists at the bottom edge of the Windows 95 screen or desktop. The taskbar contains icons that represent open applications. To start an application, the user types in the location of the application in the system's file system, or the user selects an entry in a hierarchical menu structure (i.e., the location of the application associated with the entry has already been defined). When the application is invoked, an application window is opened on the desktop. When the application's window is minimized, an icon that represents the application remains in the taskbar. To activate the application, the user moves the cursor that is displayed on the desktop (using the mouse) to the taskbar. An option that exists in Windows 95 allows the user to hide the taskbar or remove it from sight until it is needed. The taskbar appears as a thin gray line at the bottom of the display, if this option is chosen.

The menus including the Apple menu used in the Macintosh operating system and the Windows 95 taskbar have a unitary function. In the case of the Apple menu, the menu holds pointers to an element stored in the operating system's file system. The Windows 95 taskbar holds pointers to suspended applications. It is impossible, for example, to configure the menus to run an application within the menu itself. In the prior art, a menu has a unitary function that is hardwired and cannot be configured by a user.

Thus, the menus currently available, including the Macintosh Apple Menu Items and Windows 95 taskbar, do not provide a mechanism for accessing information or other items from another application. Further, in the prior art, a menu does not manage the element on a desktop to reduce the clutter. It is still necessary for a user to manage the elements on the desktop by, for example, minimizing, maximizing or otherwise hiding windows and rearranging desktop elements.

SUMMARY OF THE INVENTION

In an embodiment of the invention, the user configures panels on a computer system's GUI. The user's configuration is used to generate a representation of the panel in the computer system's GUI. The panels are automatically made accessible across multiple workspaces. An application configured to run in a panel is activated when the panel is accessed. Output from the application is displayed in the panel. Examples of applications include those that display information such as a calendar viewer and others that contain items such as GUI elements that act as pointers to file system elements.

In an embodiment of the invention, an area of the GUI is reserved for display of closed representations of a plurality of sliding panels. The reserved area comprises the edges of the GUI. Output generated in a workspace is displayed in a second, unreserved area. Thus, the GUI representations of sliding panels remain visible regardless of the output generated in a workspace. The reserved area remains constant as the user switches between workspaces. A user can access a sliding panel and its configured application while in any workspace.

In one embodiment of the invention, a user activates a sliding panel by moving the mouse pointer (e.g., cursor) into the GUI representation of a panel (e.g., the closed representation). The panel slides into view thereby allowing the user to see the information and interact with the application configured for the panel. The panel is automatically deactivated when the mouse pointer moves outside the panel. Multiple panels can be attached to each edge of the display. The content of these panels remains constant as the user switches from one workspace to another enabling the user to quickly access the information from any workspace.

In another embodiment of the invention, a sliding panel is activated by moving the cursor within the panel and pressing the mouse button. In yet another embodiment of the invention, a sliding panel is activated by entering a sequence or combination of keyboard keys. In this embodiment, a sliding panel is deactivated by entering the same or different set of keys.

A configuration user interface (UI) of a selector module is used to configure a sliding panel. The user can select an edge on which a panel exists or a new panel is to be defined. If multiple panels are configured on an edge, the user can select the desired panel. The user selects properties for the sliding panel such as the application that runs on the sliding panel, the panel's background color, and the criteria for opening and closing the panel. A panel's configuration is saved in, for example, a configuration file. The selector module accesses a panel's configuration file to display the sliding panel in the computer system's GUI.

A selector module manages the computer system's GUI. Input and output events are processed by the selector module. If an input event occurs within a sliding panel, the selector processes the event as a sliding panel event. If the input event occurs within an active sliding panel, the selector forwards the event to the panel's application. If an input event occurs outside an active sliding panel, the active sliding panel is deactivated and can be returned to its closed representation. The selector identifies the application for which the input event is intended. If the intended application is inactive, it is activated and the event is forwarded to the application. If the intended application is configured on a sliding panel, the sliding panel is opened (if it is not already open) and the input event is sent to the panel's application. An output event is displayed in the active application's display area (e.g., a sliding panel or workspace window).

DETAILED DESCRIPTION OF THE INVENTION

A method and apparatus for accessing information and other items across workspaces is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
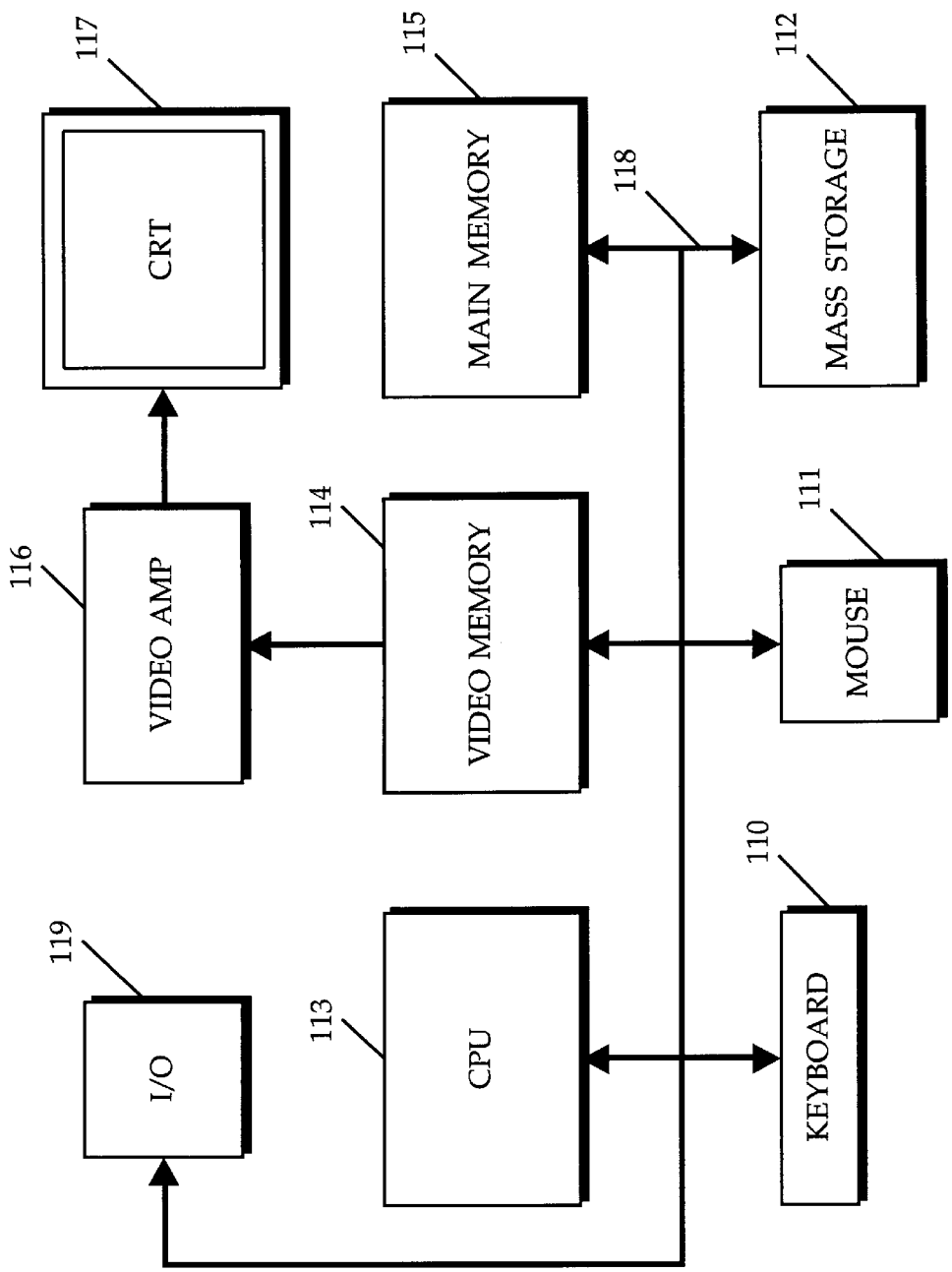
FIG. 1 provides an example of a general purpose computer that can be used in one embodiment of the invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the Power PC (e.g., 60×) processor, a 80×86 microprocessor manufactured by Intel, or a SPARC microprocessor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment.

Using embodiments of the invention, a graphical user interface (GUI) is configurable to allow access to information or other items across workspaces. A user configures sliding panels located on the edges of the GUI. A sliding panel is configured to contain an application that runs in the sliding panel. An application that runs in a sliding panel can be, for example, a container application that contains other GUI elements. Examples of a container application include drawer and gallery applications described below.

The user can configure a sliding panel to contain an application that could otherwise run in a window of the GUI. For example, a sliding panel can be configured to run a calendar viewer for viewing and updating a user's calendar. The calendar viewer runs in the sliding panel instead of a prior art window. The calendar viewer is always accessible by moving the cursor to the sliding panel along an edge in the GUI.

A configuration UI of the invention is used to configure a sliding panel by specifying the panel's properties including the application. A menu is provided in a configuration dialog that contains entries identifying possible applications. In addition to the entries in the configuration dialog, the user can specify a path (e.g., a URL) to an application.

In the preferred embodiment, the applications that run in the sliding panels of the invention are written in a language such as Java. Thus, an application is a Java-based applet or a Java Bean. A Java Bean is a reusable, distributable Java software component. The Java programming language development kit is available from Sun Microsystems, Inc.

Figure 2:
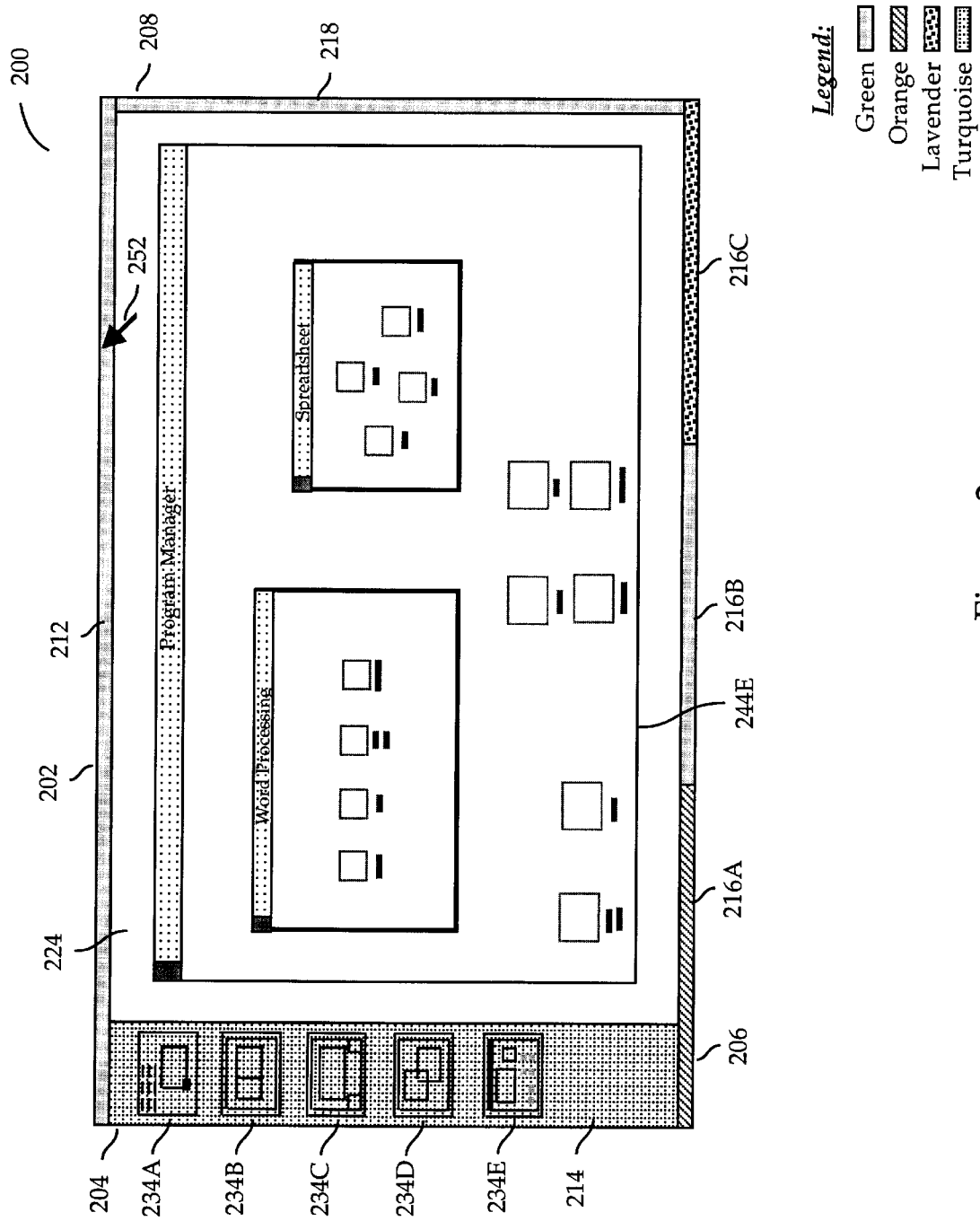
FIG. 2 provides an example of a GUI having sliding panels according to one embodiment of the invention.

FIG. 2 provides an example of a GUI having sliding panels according to one embodiment of the invention. GUI 200 includes display area 224. Display area 224 can display one or more windows such as window 244E. GUI 200 has edges 202, 204, 206, and 208 that can be configured to hold panels. In the preferred embodiment, edge 204 is configured to hold switch 214. Switch 214 includes icons 234A–234E that represent workspaces, and are selectable to move from one workspace to another.

A workspace contains a set or group of windows. For example, the desktop of a Windows 95 environment is considered a workspace. When a user switches to a different workspace, the new workspace's group of windows is displayed in display area 224. Further, the new workspace's software is activated. A currently active workspace is deactivated and its state is saved and used to re-activate the workspace.

When one of icons 234A–234E are selected, one or more windows of a workspace are displayed in display area 224. Switch 214 is used to navigate through the environments or workspaces that are available to the user. Referring to FIG. 2, a Windows 95 workspace is loaded and its group of windows is displayed in display area 224.

Edges 202, 206, and 208 can be configured to contain one or more sliding panels. A sliding panel is a GUI element that slides from an open state to a closed state. Sliding panel 212 on edge 202 is in a closed state, for example. In its closed state, sliding panel 212 is visible as a thin column along edge 202. Similarly, sliding panel 218 is positioned on edge 208. Edge 206 contains sliding panels 216A–216C.

In the preferred embodiment, a color (as illustrated in FIG. 2 using patterning) is used to identify a sliding panel. In the closed state, the color is used in the closed representation of a sliding panel. In the open state, the color is used as the sliding panel's background color. The color is used to distinguish between panels. Further, color coding can be used to match a panel in its closed state with the panel in its open state to verify that the correct panel is opened.

A sliding panel moves between the open and closed states in response to a change in position of cursor 252. When cursor 252 moves into a closed sliding panel (e.g., cursor 252 moves inside the border representing sliding panel 212 in FIG. 2), the sliding panel opens. Unless otherwise configured, when cursor 252 moves outside an open sliding panel, the sliding panel closes.

Figure 3:
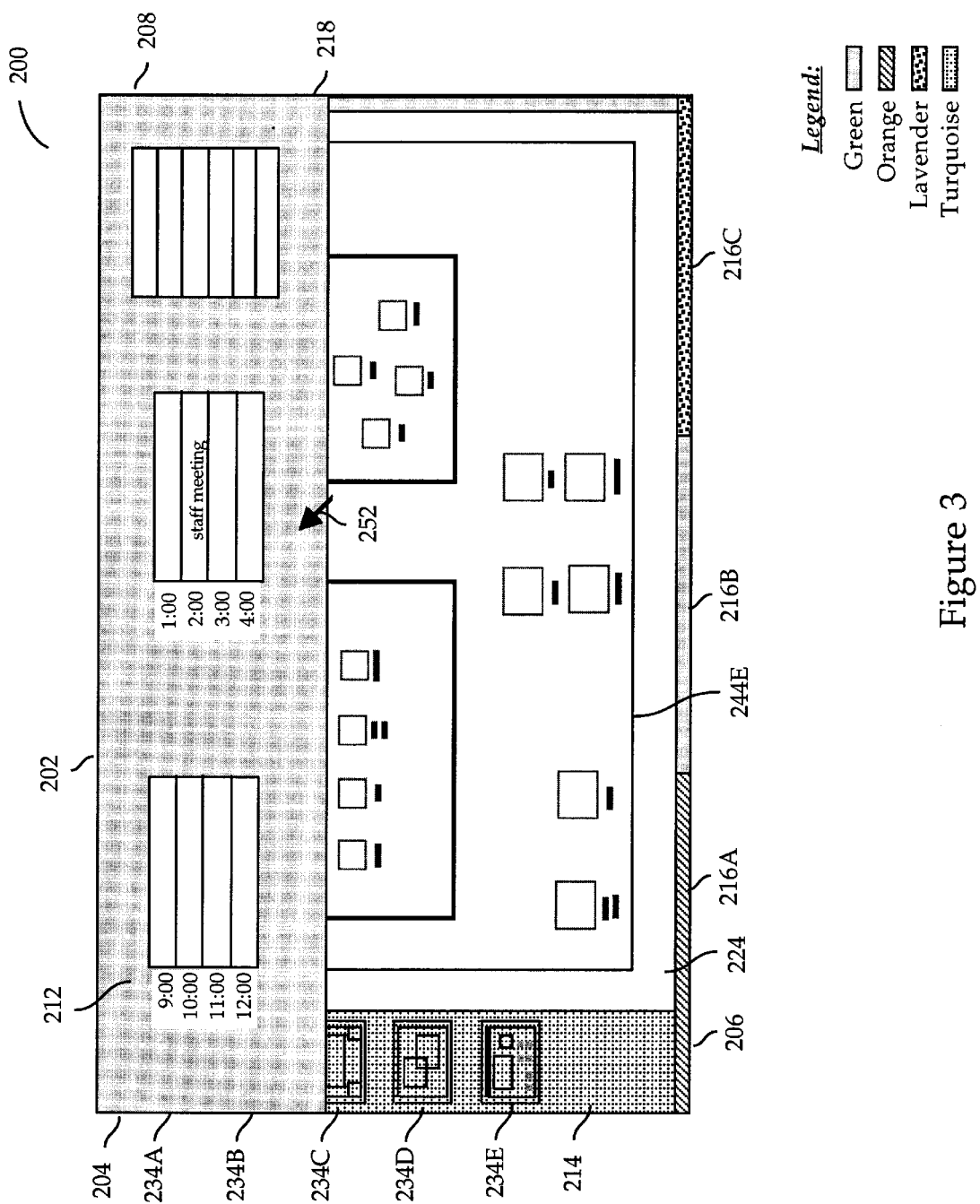
FIG. 3 provides an example of sliding panel 212 in its open state according to an embodiment of the invention.

FIG. 3 provides an example of sliding panel 212 in its open state according to an embodiment of the invention. Sliding panel 212 has been configured to contain a calendar viewer application that displays and accepts modifications to a user's calendar. In FIG. 2, sliding panel 212 is closed. To access the calendar viewer application, the user moves cursor 252 into the columnar representation of sliding panel 212 in FIG. 2. Sliding panel 212 slides open and is illustrated in FIG. 3 in its open representation. Sliding panel 212 provides an example of an open representation in which the panel is enlarged or maximized. The open representation of sliding panel 212 extends horizontally from and along edge 202 between edges 204 and 208. To close sliding panel 212, the user moves cursor 252 outside sliding panel 212.

Figure 4:
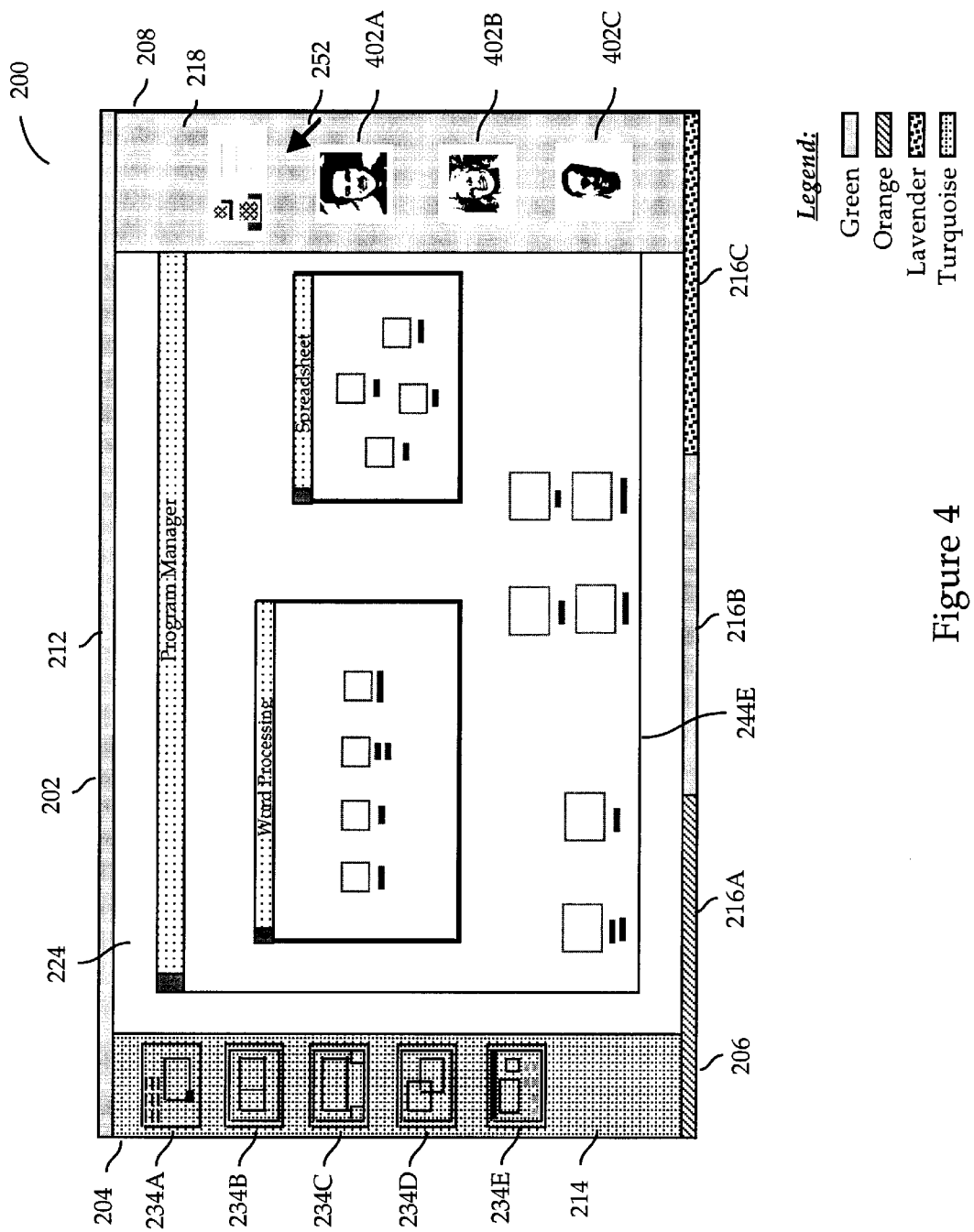
FIG. 4 provides an example of an application that runs in sliding panel 218 according to an embodiment of the invention.

Similarly, sliding panel 218 is opened by moving cursor 252 within the border of sliding panel 218. FIG. 4 provides an example of a gallery application that runs in sliding panel 218 according to an embodiment of the invention. The output of the gallery application is displayed in an open representation of sliding panel 218. The open representation of sliding panel 218 extends vertically from edge 208 between edges 202 and 206. Sliding panel 218 contains icons 402A–402C each of which is an image of a person. The user can depress a mouse button while the cursor is positioned over one of images 402A–402C. A pop up menu is displayed that contains a list of operations that the user can perform relative to the person whose image is displayed in one of icons 402A–402C. Examples of operations include sending mail, placing a sticky note on the person's screen, opening a network-based audio/video conference, or viewing or updating the person's calendar. Sliding panel 218 is closed when cursor 252 is moved outside the panel.

Figure 5:
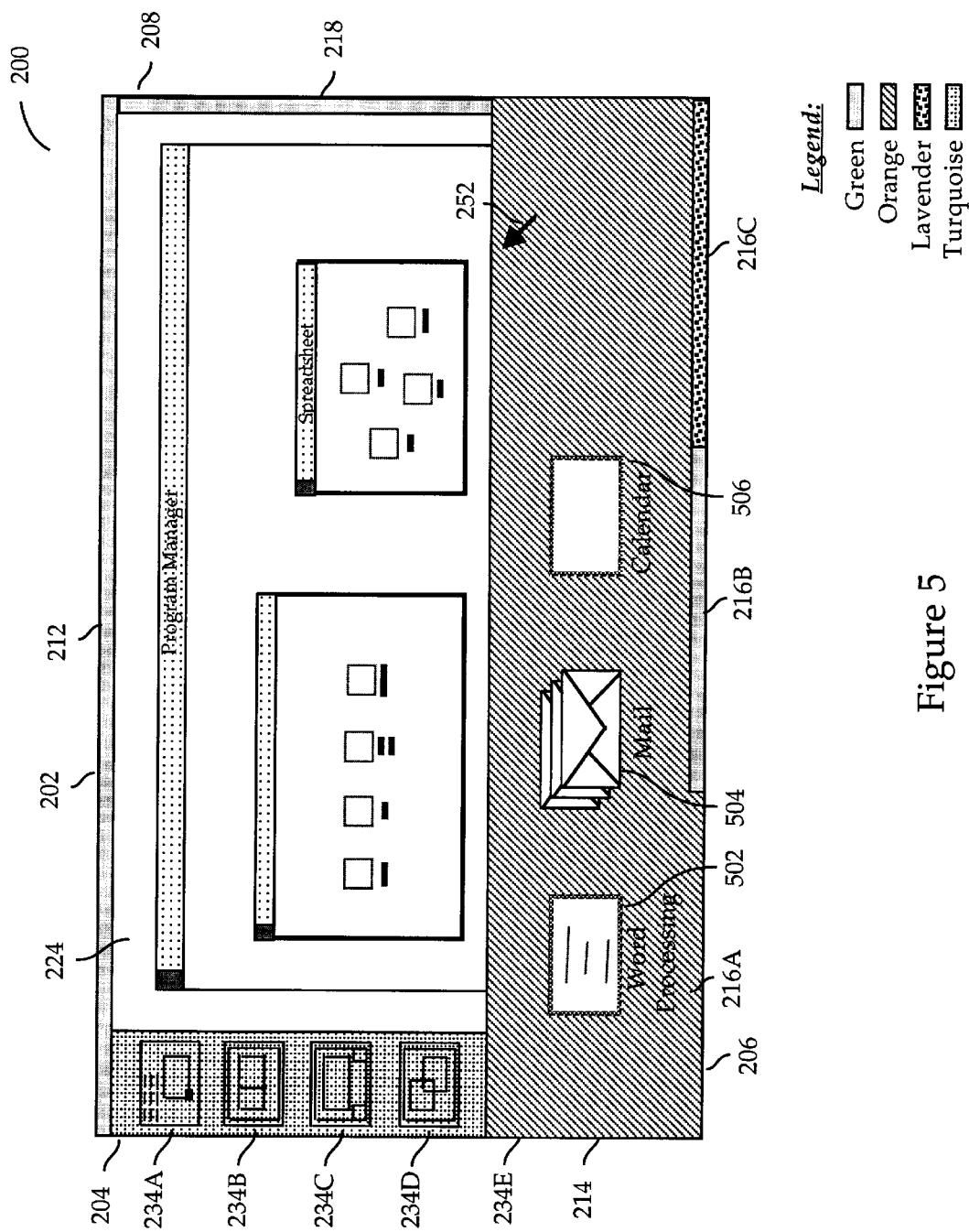
FIG. 5 provides an example of an open sliding panel configured for a drawer application according to an embodiment of the invention.

Referring to FIG. 2, multiple sliding panels (e.g., sliding panels 216A–216C) can be defined on an edge (e.g., edge 206). A column is displayed on edge 206 for each of sliding panels 216A–216C. A technique (e.g., color coding or patterning) is used to distinguish one sliding panel from another. One of sliding panels 216A–216C can be selected by moving cursor 252 into the panel's closed representation. When, for example, cursor 252 is moved into sliding panel 216A, it opens to display the output of the configured application (e.g., a drawer application). FIG. 5 provides an example of an open sliding panel configured for a drawer application according to an embodiment of the invention. The diagonal line pattern used with sliding panel 216A in FIG. 2 is used as a background for sliding panel 216A in its open state. Thus, the user can verify that the correct panel was open.

Sliding panel 216A is configured to contain a drawer application. The drawer application is a container application. Items can be moved into a drawer. An item that is moved into the drawer is depicted as an icon that is displayed in the drawer's sliding panel. Various techniques such as drag and drop or cut and paste can be used to move an item into the drawer.

The drawer application running in sliding panel 216A contains icon 502 that points to a word processing application, for example. Icons 504 and 506 represent mail and calendar applications, respectively. To access one of these applications, the user moves cursor 252 into sliding panel 216A (thereby opening the panel) and selects one of icons 502–506 (e.g., by clicking on one of icons 502–506).

A sliding panel can be configured to remain open despite the position of cursor 252 (e.g., within or without sliding panel 216A). If it is not configured to remain open, the user can close sliding panel 216A by moving cursor 252 outside sliding panel 216A. If, however, the user configures it to remain open, sliding panel 216A remains open even when cursor 252 moves outside the panel. If a sliding panel is configured to remain open, another panel can be opened in front of the sliding panel that is configured to remain open. Further, it is possible to configure a sliding panel to open only if cursor 252 is within the thin column that represents the panel's closed state and the mouse button is depressed.

As can be seen in FIG. 5, sliding panels 216B–216C are visible regardless of the state of sliding panel 216A. Thus, the user can select one of sliding panels 216B–216C by moving cursor 252 into their visible portions. Sliding panel 216B is selected by moving cursor 252 into its associated shaded area. Sliding panel 216B slides open and sliding panel 216A is closed. Sliding panels 216A and 216C remain visible in their closed representation when sliding panel 216B is open.

When an application that is configured on a sliding panel is not being used, its associated sliding panel can be closed such that only a thin band is visible in GUI 200. The sliding panel is closed by moving cursor 252 off the panel. The drawer application is accessible by moving cursor 252 into the thin band that represents the closed sliding panel. A sliding panel (e.g., sliding panels 212, 216, and 218) are accessible regardless of what is being displayed in display area 224. A panel's GUI representation is visible within GUI 200 in either an open or a closed state. Thus, there is no need to rearrange elements displayed in GUI 200 to access an application running in a sliding panel of the invention.

Figure 7A:
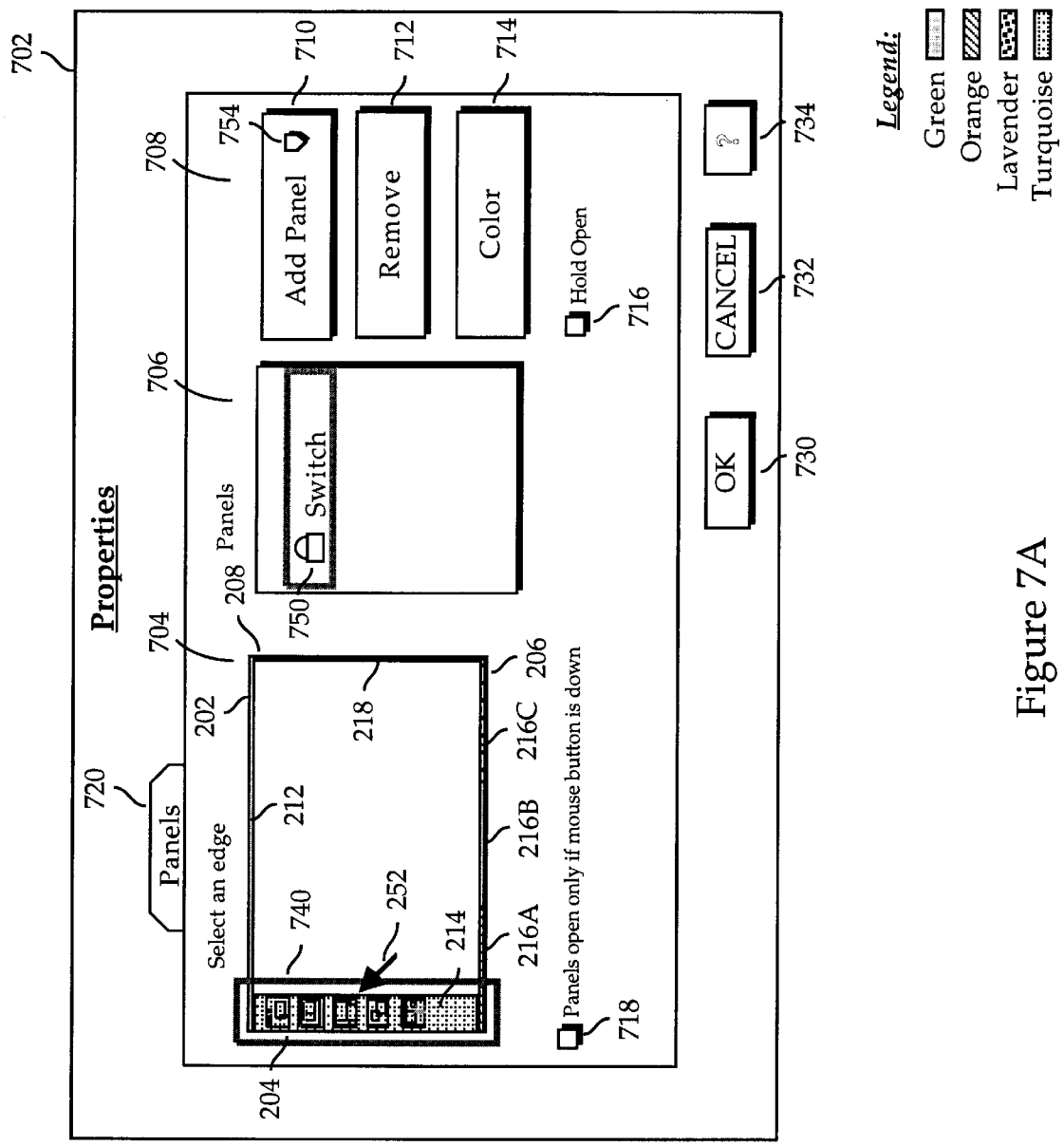
FIGS. 7A–7B illustrate a dialog in the configuration user interface according to an embodiment of the invention.
Figure 7B:
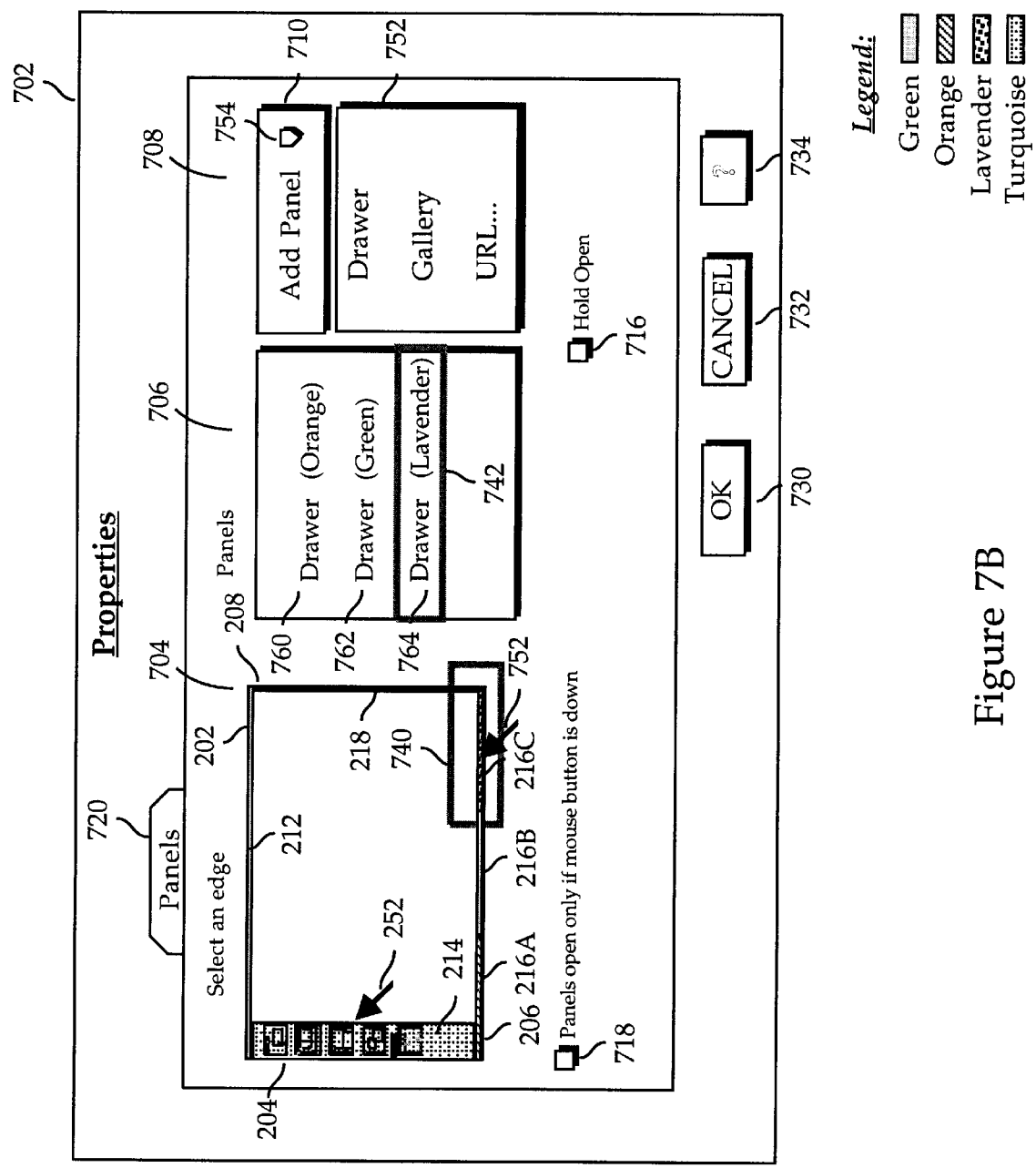

Drawer, gallery, and calendar view applications are examples of applications that can be used with the invention. However, the invention is not limited to these applications. The sliding panels of the invention can be configured to run any application. A user uses the configuration user interface (UI) of the invention to configure a sliding panel. In the preferred embodiment, a configuration UI consisting of dialogs is used to configure a sliding panel. The configuration user interface is accessible by pressing the command button on the mouse, for example. FIGS. 7A–7B illustrate a dialog in the configuration UI in an embodiment of the invention.

Dialog 720 is used to configure (e.g., specify the properties of) a sliding panel. Dialog 720 is used to define, modify or delete sliding panels, for example. Dialog 720 includes sections 704, 706, and 708. Section 704 of dialog 720 provides a representation of GUI 200. In section 704, the user selects one of edges 202–208 using cursor 252. An edge selected by the user is highlighted in section 704 by, for example, forming box 740 around the selected edge (e.g., edge 204).

Information related to the panels along a selected edge is displayed in section 706. Entry 750 in section 706 indicates that a switch is configured for edge 204, for example. Entry 750 also indicates that the switch is locked. A locked panel is not removable from the display. It can be moved to another edge, however. The addition or removal of selectables in switch 214 is preferably performed by a system administrator. The user can select a panel for configuration by selection an entry in section 706.

Section 708 of dialog 720 provides selection boxes 710–714 that represent configuration operations. For example, a new panel can be added to an edge using box 710. Alternatively, an unlocked panel can be deleted using box 712. The background color can be set for an existing panel using box 714.

Additionally, check boxes 716 and 718 can be used to set properties of a sliding panel. The default property configuration is such that a panel opens when cursor 252 is moved inside a panel's border regardless of the positioning of a mouse button and closes when cursor 252 moves outside the panel's border. Check box 718 overrides the default such that the panel opens when cursor 252 is within the panel's border and the mouse button is depressed. A sliding panel remains open when cursor 252 is moved off the panel when check box 716 is checked.

Configuration UI 702 can be exited by selecting either button 730 or button 732. The changes made to the sliding panel configuration are saved when button 730 is used to exit configuration user interface 702. To cancel the changes specified in the current configuration session, the user selects button 732. A help button (e.g., button 734) provides additional documentation to assist in the configuration process.

As previously discussed, an edge can contain multiple panels. When the user selects one of edges 202–208, the panels configured on that edge are identified in section 706. To configure a specific panel, the user selects an entry in section 706 (entries 760–764). Entries 760–764 correspond to sliding panels 216A–216C, respectively. The selected panel is highlighted in section 704. FIG. 7B illustrates dialog 720, when the user selects sliding panel 216C. Box 740 appears as a box that encloses panel 216C in section 704 to designate it as the selected panel. Entry 764 in section 706 that corresponds to sliding panel 216C and is highlighted (e.g., box 742). Box 740 can be dragged in section 704 to select another edge or another sliding panel.

A sliding panel can be added to one of edges 202–208 by selecting button 710 (see FIG. 7A). As is indicated by down arrow 754, additional information is available by selecting button 710. The additional information is contained in box 752 (see FIG. 7B) and identifies possible applications that have been identified to configure a sliding panel. The applications identified in box 752 are by way of example only. Additional or different applications can be displayed in box 752. Box 752 can be used, for example, to provide easy access to a set of applications that an enterprise wishes its employees to use. In FIG. 7B, box 752 contains the drawer and gallery applications previously discussed. Box 752 contains selections that form a set of applications for configuring sliding panels.

In addition to the set of applications identified in box 752, box 752 includes an entry that allows a user to specify the path or address to another application that is to be configured to run in a sliding panel. The path or address can be in the form of a universal resource locator (URL) when specifying an application in the World Wide Web (WWW) environment, for example. Any type of path designation can be used with the invention, however. When a new panel application is selected, its graphic representation is displayed in section 704 (e.g., sliding panels 216A–216C, 212, and 218). Further, an entry is added to section 706.

Figure 8:
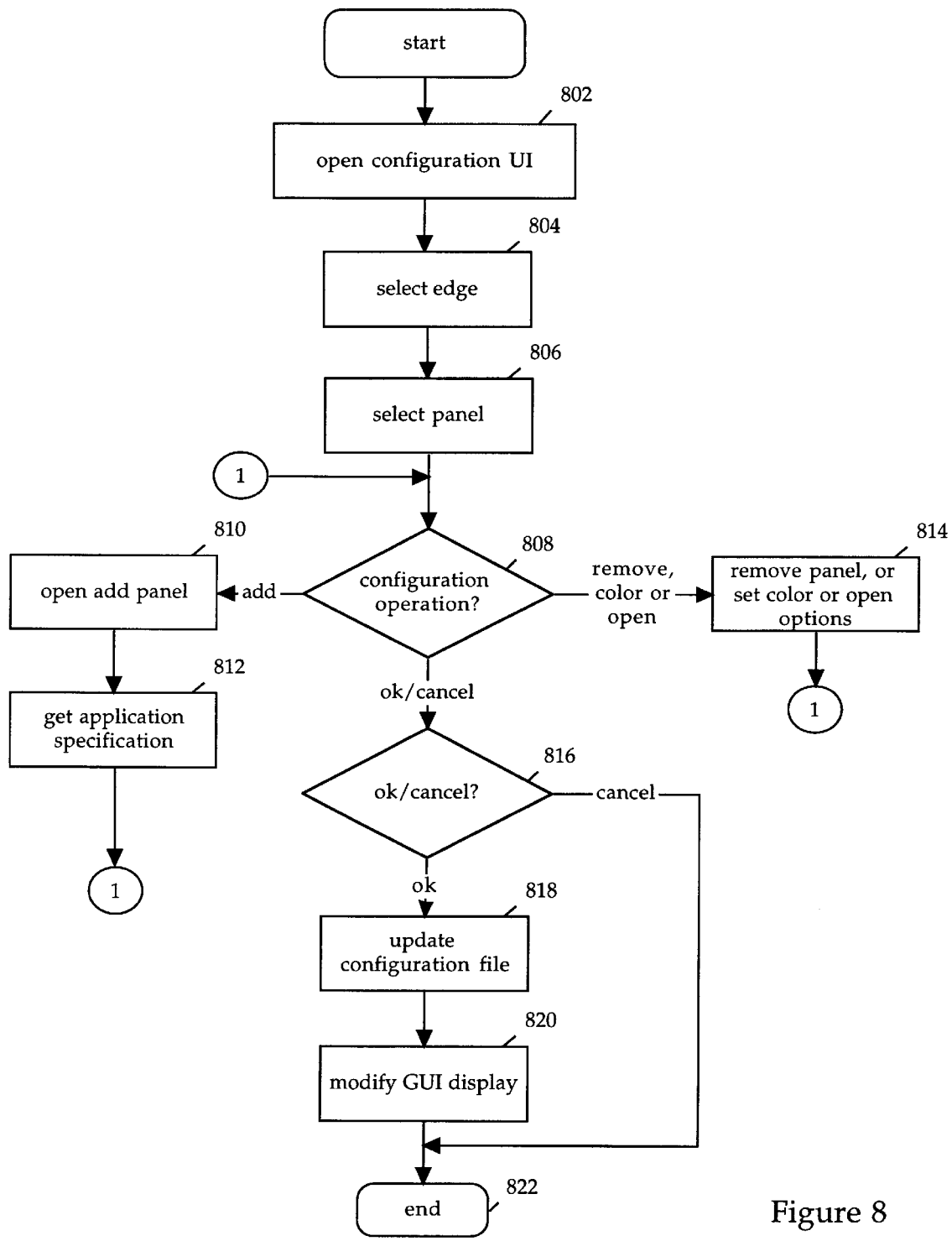
FIG. 8 provides a configuration flow according to an embodiment of the invention.

FIG. 8 provides a configuration flow according to an embodiment of the invention. At step 802, the user opens configuration user interface 702 (e.g., by depressing a button on the mouse). The user selects an edge in section 704 of dialog 720 using cursor 252 at step 804. In response to the selection, the selected edge is highlighted (e.g., box 740) and the panels configured on the edge are identified in section 706. At step 806, the user selects a panel. For example, the user can select a panel by selecting an entry in section 706.

The user specifies the properties for an existing or new panel in section 708 and by selecting or deselecting check boxes 716–718. At step 808 (i.e., "configuration operation?"), the type of property specification input (if any) received from the user is determined. If an add operation is received from the user, processing continues at step 810 to display box 752. At step 812, the selection input is received from the user. The selection input specifies an application by selecting one of the entries in box 752 (e.g., Drawer, Gallery, or URL). Input in the form of a URL includes the path or address of an application. Processing continues at step 808 to handle another configuration operation.

If it is determined at step 808 that the user specified a remove, color, or open operation, processing continues at step 814 to perform the requested operation. A remove operation, removes the selected sliding panel. The color operation modifies the color used in the open and closed representations of the selected sliding panel. Similarly, the open options (e.g., hold open and open with mouse button down) specify the manner in which the selected sliding panel is opened or remains open.

The user can exit the configuration UI by either accepting or canceling the modifications made during the configuration session. For example, the user can select button 730 of FIGS. 7A–7B to accept or button 732 to cancel the modifications. If it is determined at step 816 that the user wants to exit the configuration UI and accept the modifications (e.g., the user selects ok using button 730), processing continues at step 818 to update the necessary configuration files (e.g., the configuration files associated with sliding panels modified during the configuration session). A panel's configuration file specifies the properties associated with a panel including the application that runs in the panel, the panel's edge and background color, and the circumstances under which a panel is opened or is closed.

At step 820, GUI 200 is modified to reflect the configuration modifications made by the user. Modifications include those made to new or existing panels. For example, a newly configured panel is added to GUI 200 on the edge specified by the user. The new panel is color-coded as specified in dialog 720. To illustrate further, a modified color coding can be reflected in an existing panel's graphical representation.

In the preferred embodiment, GUI 200 is managed by a mechanism referred to as a selector. The selector is a software application that manages switch 214. The selector displays a single workspace in display area 224. A user can move between workspaces by making a selection in switch 214. The state of a workspace is saved when it is switched out and is restored when it is switched back in. Thus, the application(s) running in a workspaces are effectively always running. There is no need to start and stop an application.

Referring to FIG. 2, the user selects the workspace displayed in 224 (i.e., represented as window 244E in display area 224) by selecting icon 234E of switch 214. In response to the user input, the selector module switches to the new workspace and displays the new workspace's window(s) in display area 224 (e.g., window 244E). The user can select another workspace by selecting one of icons 234A–234E.

Figure 6A:
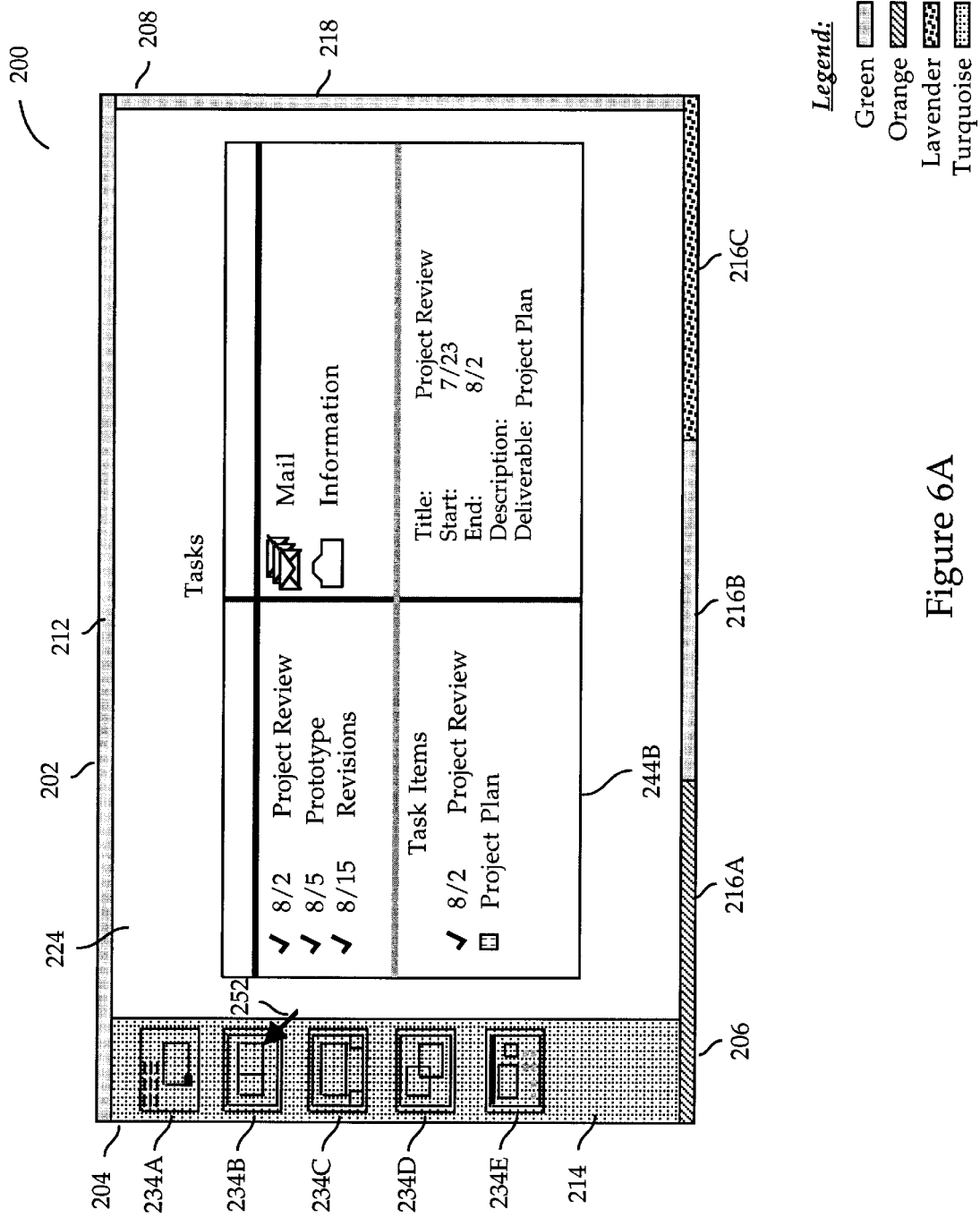
FIG. 6A provides an illustration of GUI 200 after the user selects a new workspace according to an embodiment of the invention.

FIG. 6A provides an illustration of GUI 200 after the user selects a new workspace according to an embodiment of the invention. Cursor 252 is positioned over icon 234B in switch 214 to select the workspace represented by icon 234B. The user input is received by the selector and is determined to be a request from the user to switch to the new workspace. The selector deactivates the current workspace (e.g., workspace associated with window 244E). The new workspace is activated and displayed in display area 224 (e.g., window 244B in FIG. 6A).

Switch 214 and sliding panels 212, 216A–216C and 218 remain accessible despite a change in workspaces. Referring to FIG. 2, when icon 234A is selected and window 244E is displayed in display area 224, switch 214 and sliding panels 212, 216A–216C and 218 are accessible. Switch 214 and sliding panels 212, 216A–216C and 218 are also accessible when icon 234B is selected and window 244B is displayed in display area 224.

In the preferred embodiment, an area of GUI 200 is reserved for switch 214 and sliding panels 212, 216A–216C, and 218. When a sliding panel is closed, its closed representations is displayed in the reserved area (see panels 212, 216A–216C, and 218 in FIG. 2, for example). When a panel is open, a portion of its open representation is visible in the reserved area (e.g., the portion of panel 216A in FIG. 5 that touches edge 206). Thus, a sliding panel is always accessible by touching the edge of GUI 200 with cursor 252 configured for the sliding panel. A remaining portion of GUI 200 (e.g., display area 224) is used to display windows or other output of a workspace. Output from a workspace does not overlay elements contained in the reserved area.

A sliding panel is configured to run an application that can display information such as a calendar viewer. Other types of applications can be configured with a sliding panel that display items in the sliding panel such as GUI elements as illustrated by the drawer and gallery applications discussed above. The sliding panel's application is accessed by accessing the sliding panel. When the sliding panel is accessed, its application is activated. Since a representation of a sliding panel is always visible and accessible in at least the reserved area of GUI 200, its application is always accessible. As the user switches between workspaces, the sliding panel's remains accessible in at least the reserved area of GUI 200. Thus, the user can access the information and items generated by a sliding panel application across multiple workspaces.

Figure 6B:
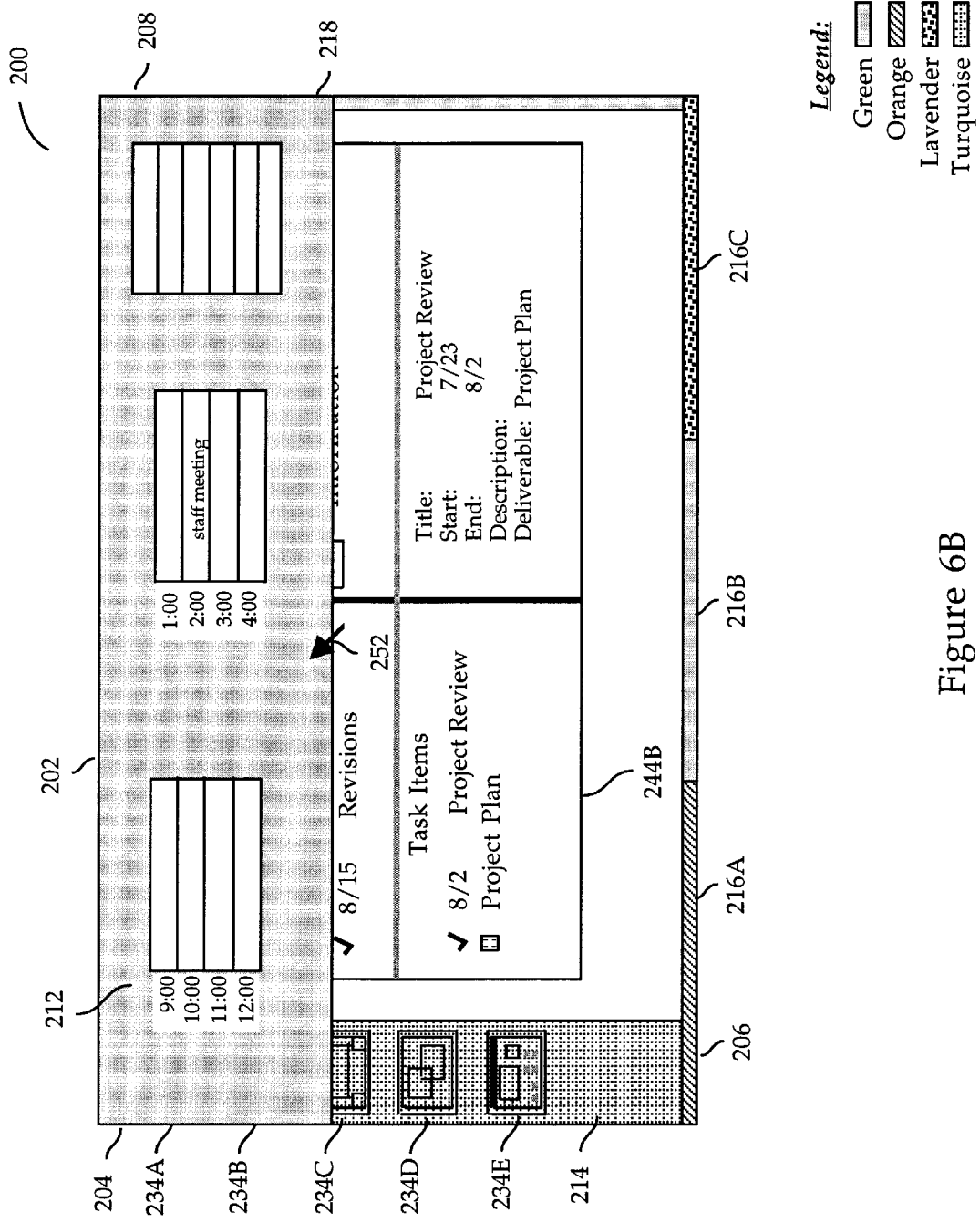
FIG. 6B provides an illustration of the GUI when a sliding panel is accessed in another workspace according to an embodiment of the invention.

Referring to FIG. 3, the user accesses sliding panel 212 and the application configured thereon while in one workspace as discussed above. Sliding panel 212 is also accessible from the new workspace as illustrated in FIG. 6A. The user moves cursor 252 within sliding panel 212 in FIG. 6A to access the panel and its associated application. FIG. 6B provides an illustration of the GUI when a sliding panel is accessed in another workspace according to an embodiment of the invention.

In one embodiment of the invention, by moving the cursor over the closed representation of sliding panel 212 (e.g., sliding panel 212 in FIG. 6A), sliding panel 212 opens to display the output of its associated application. The user can therefore access the information contained in sliding panel 212 regardless of the workspace that is currently being accessed and displayed in display area 224 (e.g., windows 244E and 244B). Sliding panel 212 can be closed by moving cursor 252 outside the panel. Sliding panels 218 and 216A–216C are similarly accessible.

The sliding panel representations displayed in GUI 200 are generated by the selector using one or more configuration files. In addition to the configuration files, a sliding panel's graphic representation depends on the number of other panels that are configured for the same edge. For example, a lone panel on an edge runs the length of the edge in its closed state. If another panel is added to the edge, the original panel's bounds comprise half the length of the edge. Similarly, the addition of a third panel reduces the size of each panel to one-third of the edge. The selector manages the sliding panels using the configuration information set by the user and the runtime information.

Figure 9:
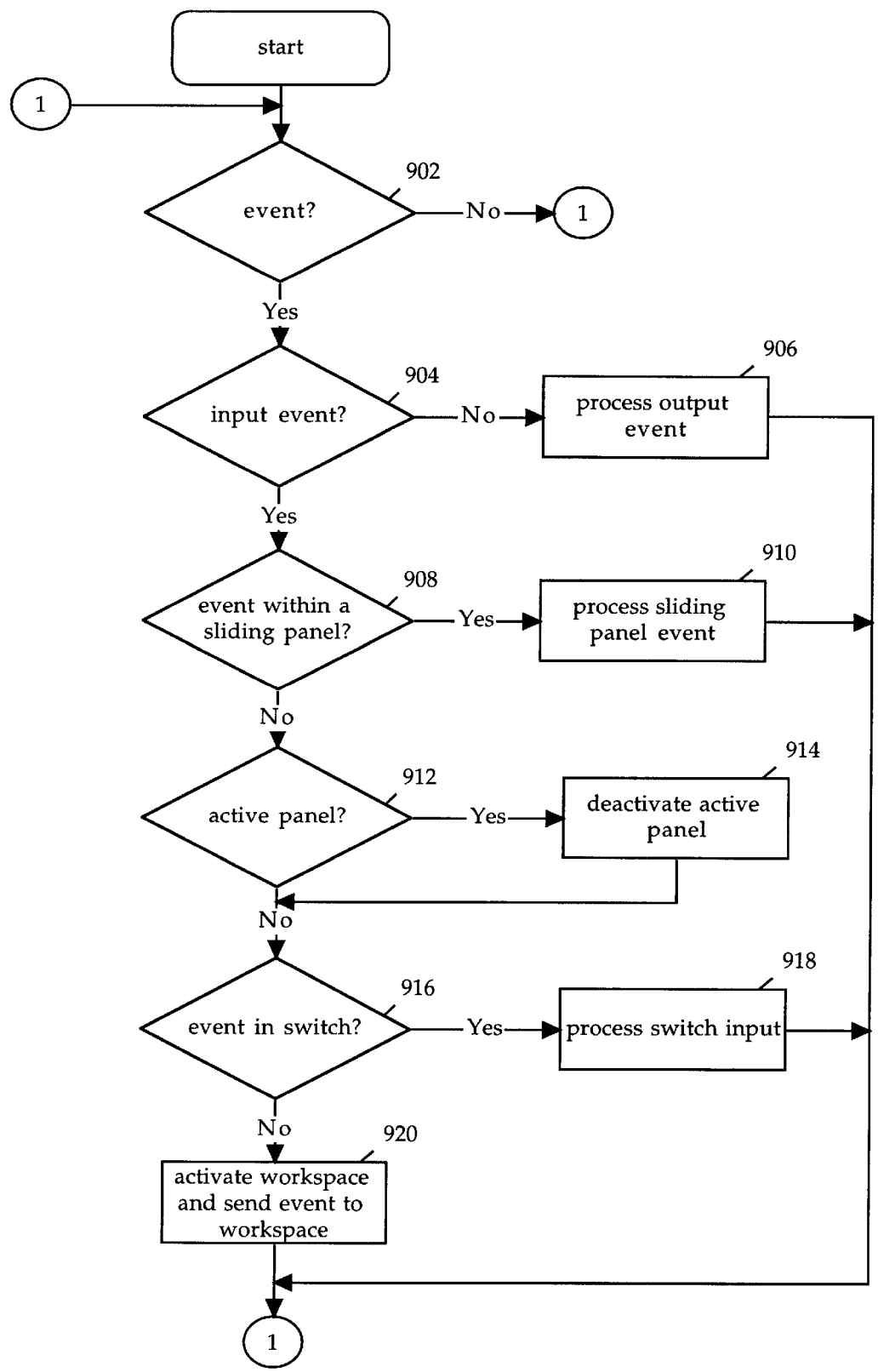
FIG. 9 provides a selector process flow according to an embodiment of the invention.

The selector monitors events such as the movement cursor 252 and opens a closed sliding panel when a panel activation event (e.g., cursor 252 comes in contact with the sliding panel's GUI closed representation) occurs. When a panel deactivation event occurs (e.g, the cursor is moved outside an open sliding panel), the selector closes the sliding panel if the panel's configuration specifies that it should be closed. Further, the selector monitors other user input to process workspace transition requests. User input directed to an application running in a workspace or a sliding panel is forwarded to the application. Similarly, output generated by an application is displayed in the application's display in GUI 200. FIG. 9 provides a selector process flow according to an embodiment of the invention.

At step 902 (i.e., "event?"), a determination is made whether an event has occurred for processing by the selector. Such events include cursor movement, mouse button down, keyboard input, or output from an application. If an event has not occurred, event monitoring continues at step 902. If an event has occurred, processing continues at step 904. A determination is made at step 904 (i.e., "input event?") whether the event is an input event such as mouse or keyboard input. If it is determined that it is an input event (e.g., an application has generated output), processing continues at step 906 to process the event as an output event. For example, application output is displayed in the application's display area in GUI 200. Processing continues at step 902 to wait for another event.

If the event is an input event, processing continues at step 908 (i.e., "event within a sliding panel?") to determine whether the input event occurred within a sliding panel. In one embodiment of the invention, an input event is considered to be within a sliding panel, if cursor 252 is within the sliding panel at the time of the input event. If an input event is within a sliding panel, the input event (e.g., movement of cursor 252, keyboard input, or a mouse button event) is considered to be a sliding panel event. If the input event is determined to be a sliding panel event, processing continues at step 910 to process the sliding panel event (e.g., see FIGS. 10A–10B and accompanying discussion below). Processing continues at step 902 to wait for another event.

If it is determined (at step 908) that the event is not a sliding panel event, processing continues at step 912. An event that occurs outside an active sliding panel results in the active sliding panel being closed. In one embodiment of the invention, the event that results in an active sliding panel being closed is the movement of cursor 252 out of the sliding panel. A determination is made at step 912 (i.e., "active panel?") whether a sliding panel was active at the time of such an event. If not, processing continues at step 916. If it is determined that a sliding panel is active and the event is not a sliding panel event, processing continues at step 914 to deactivate the active sliding panel (e.g., see FIG. 11 and accompanying discussion below). Processing continues at step 916 to process the current event.

At step 916 (i.e., "event in switch?"), a determination is made whether the event occurred in switch 214. If so, processing continues at step 918 to process the switch event (e.g., see FIG. 12 and discussion below), and processing continues at step 902 to wait for another event. If it is not a switch event, processing continues at step 920 to process the event as a workspace event. At step 920, the workspace is activated, if it is not already active. The event is sent to the application running in the active workspace. Processing continues at step 902 to wait for another event.

Figure 10A:
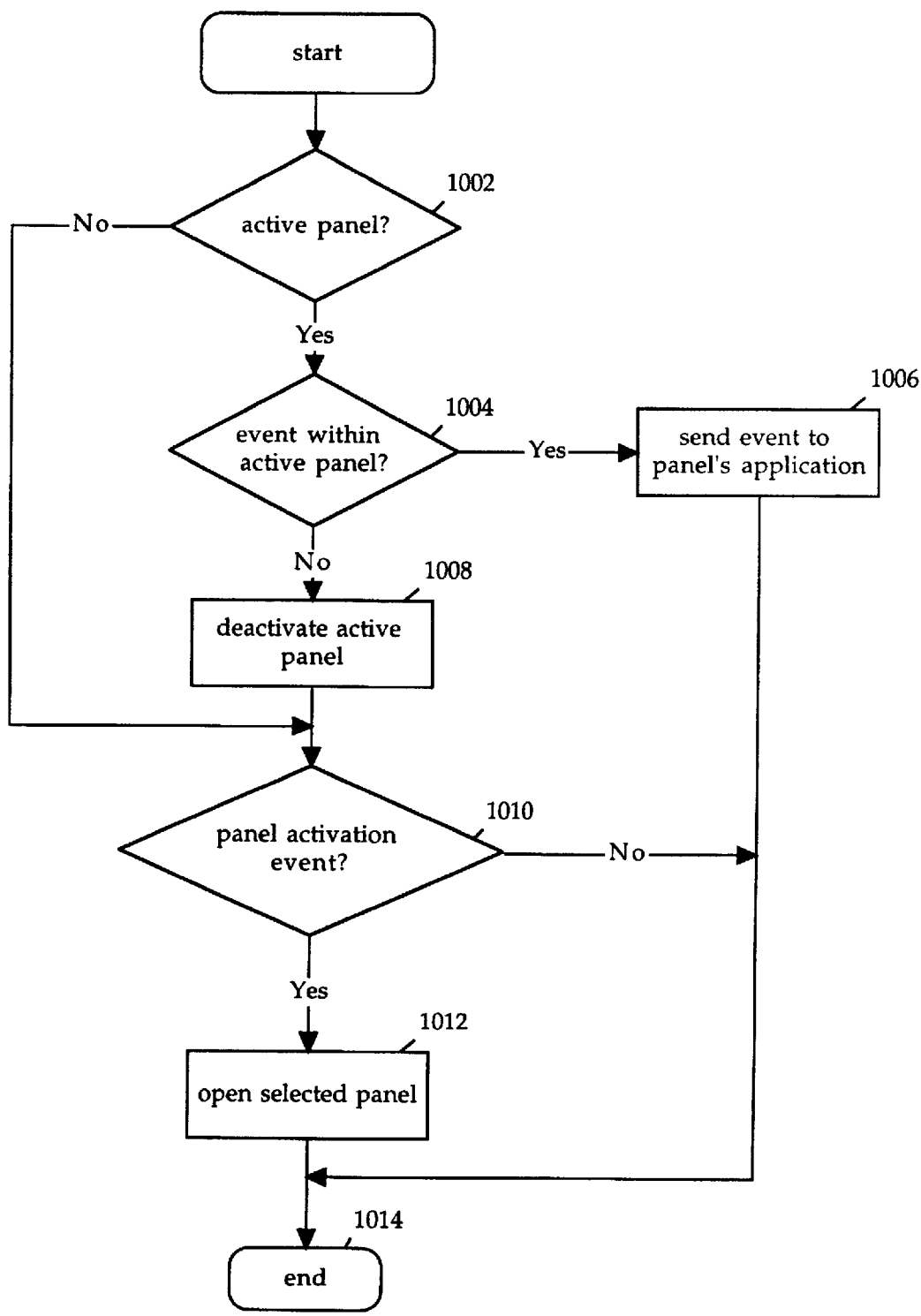
FIGS. 10A–10B provide a sliding event process flow according to an embodiment of the invention.
Figure 10B:
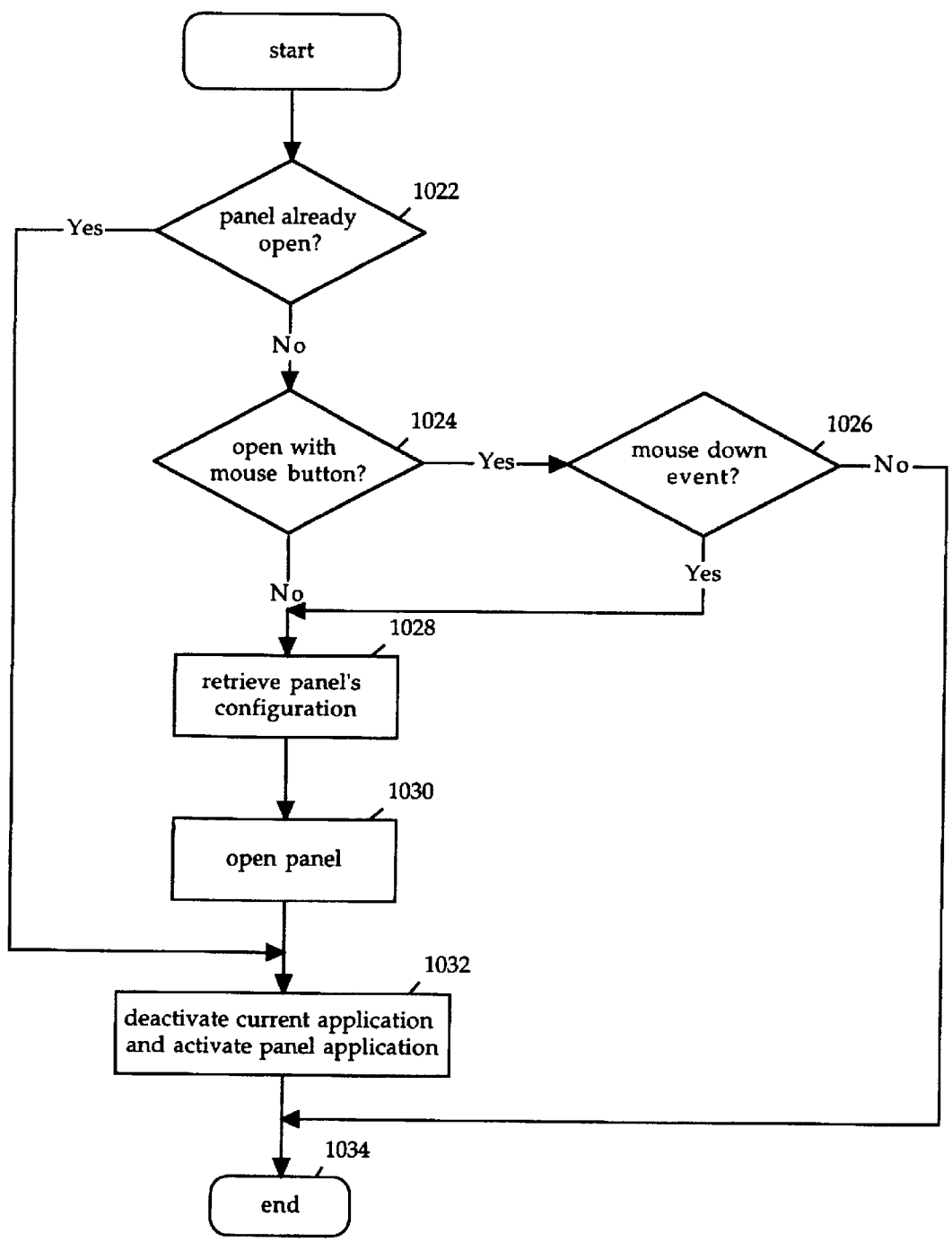

A sliding panel event includes, for example, cursor movement, a mouse button down, or keyboard input while the cursor is within either an open or closed sliding panel representation. FIGS. 10A–10B provide a sliding event process flow according to an embodiment of the invention. At step 1002 (i.e., "active panel?"), a determination is made whether there is an active sliding panel. If it is determined at step 1002 that there is an active panel, processing continues at step 1004 ("event within active panel?") to determine whether the current event is within the active panel. If so, processing continues at step 1006 to send the event to the panel's application and processing continues at step 902 to wait for another event. If it is determined that the current event did not occur in the active panel, processing continues at step 1008 to deactivate the active panel and processing continues at step 1010 to determine whether to open and activate a sliding panel.

In one embodiment, a sliding panel is activated when cursor 252 is moved within its representation. In another embodiment, the sliding panel is configured such that a mouse down event must occur while cursor 252 is within the panel's GUI representation. In yet another embodiment, keyboard input (e.g., a combination or sequence of keys) can be used to activate and deactivate a sliding panel. Other techniques can also be used to activate or deactivate a panel. At step 1010 (i.e., "panel activation event?") a determination is made whether the current event is a panel activation event.

If the current event is not a panel activation event, processing continues at step 902 to wait for another event. If the current event is a panel activation event, processing continues at step 1012 to open the selected sliding panel (e.g., see FIG. 10B and accompanying discussion below). Processing continues at step 902 to wait for another event.

FIG. 10B provides an open sliding panel process flow according to an embodiment of the invention. As previously discussed, a sliding panel can remain open after it is deactivated. Thus, at step 1022 (i.e., "panel already open?"), a determination is made whether the panel selected by the user is already displayed in GUI 200 in its open state. If so, processing continues at step 1032 to deactivate the currently active application (if not already deactivated) and activate the sliding panel's application. Processing continues at step 902 to wait for another event.

If the sliding panel is not already open, processing continues at step 1024 (i.e., "open with mouse button?") to determine from the panel's configuration whether the panel is opened only if the cursor is within the sliding panel and the mouse button is down. If the panel is not configured for a mouse down event, processing continues at step 1028. If a mouse down event is configured for the panel, processing continues at step 1026 (i.e., "mouse down event?") to determine whether there is a mouse button down event. If there is no mouse down event, processing continues at step 902 to await another event. If there is a mouse button down event, processing continues at step 1028. The panel's configuration is retrieved at step 1028. At step 1030, the sliding panel is opened. At step 1032, the currently active application is deactivated (if necessary) and the panel application is activated. Processing continues at step 902 to await another event.

Figure 11:
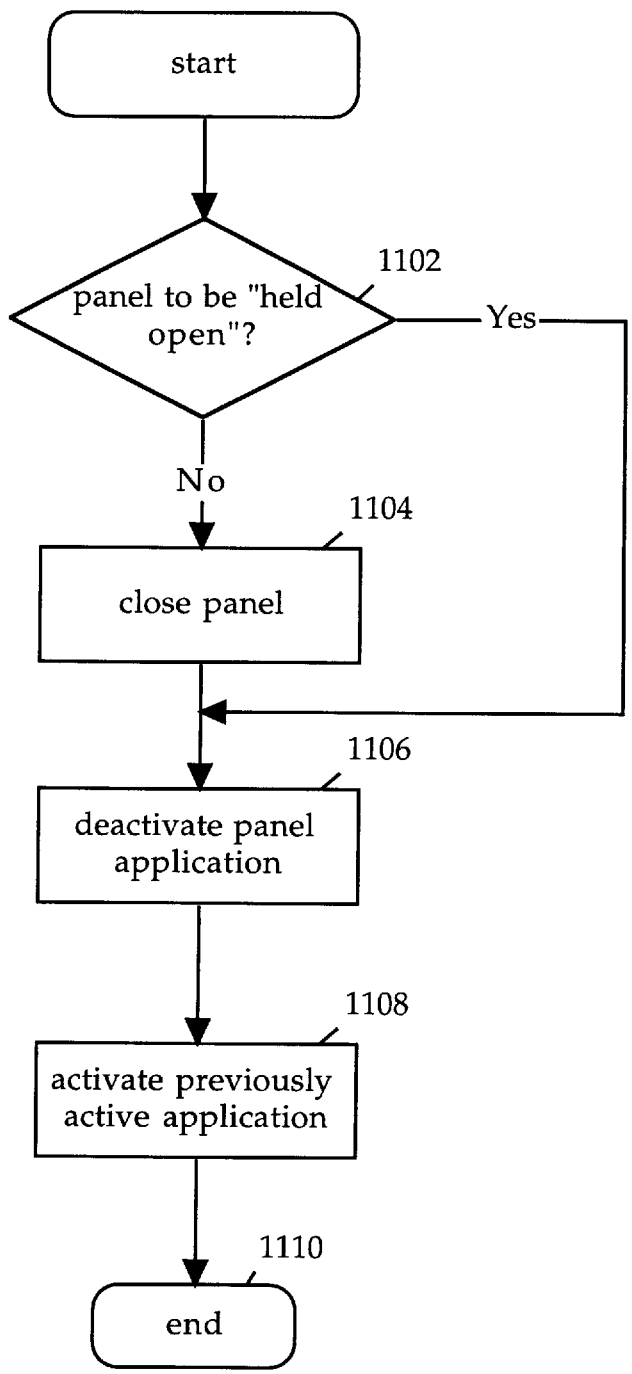
FIG. 11 provides a close panel process flow according to an embodiment of the invention.

As previously discussed, an active panel can be closed if an event occurs outside the active sliding panel. In the preferred embodiment, the event that results in an active sliding panel being closed is the movement of cursor 252 outside of the active panel. FIG. 11 provides a close panel process flow according to an embodiment of the invention. At step 1102 (i.e., "panel to be 'held open'?"), a determination is made whether the active panel is configured to remain in its open representation in the GUI when cursor 252 is moved outside the panel. If so, processing continues at step 1106. If the panel is to be returned to its closed representation, processing continues at step 1104 to close the panel in the GUI. Processing continues at step 1106. At step 1106, the sliding panel's application is deactivated. At step 1108, the application that was active when the sliding panel was selected by the user is reactivated. Processing continues at step 902 to await another event.

Figure 12:
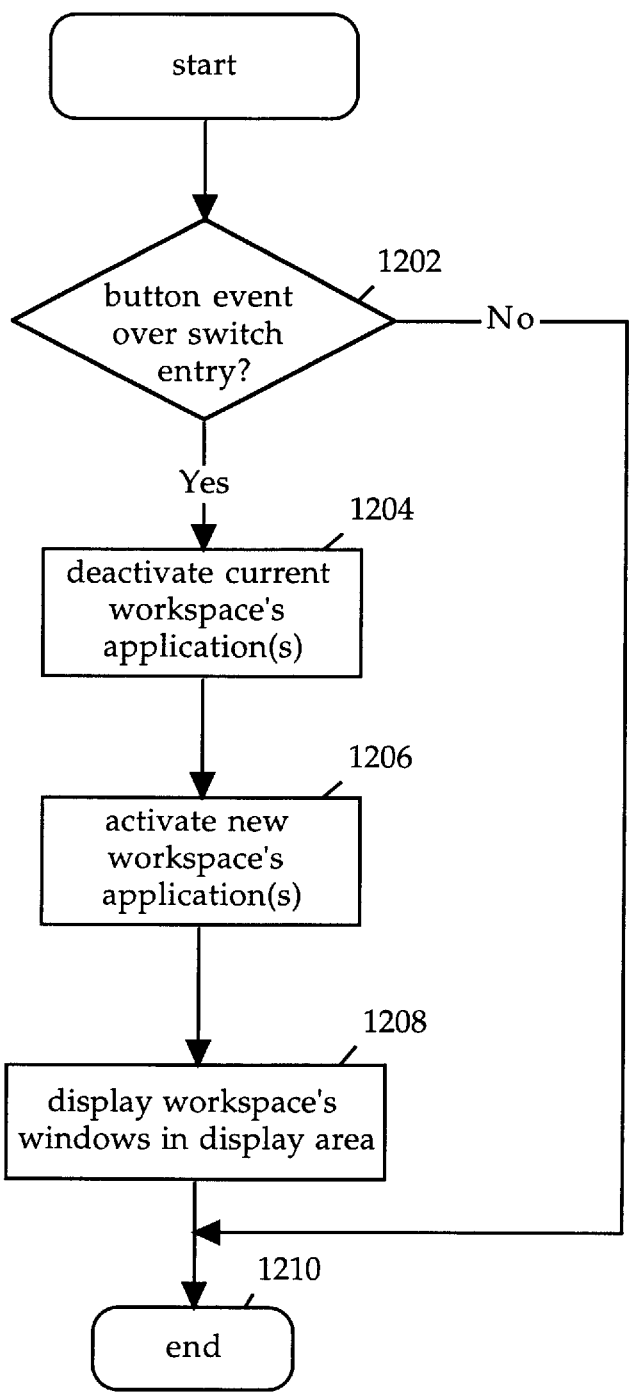
FIG. 12 provides a switch event process flow according to an embodiment of the invention.

The current event can be determined in step 916 of FIG. 9 to occur in switch 214. In this case, processing continues to process the switch event. FIG. 12 provides a switch event process flow according to an embodiment of the invention. In the preferred embodiment, a switch event is a button down event that occurs over an icon (e.g., icons 234A–234E) in switch 214. At step 1202 (i.e., "button event over switch entry?"), a determination is made whether a button down event occurred over an entry (e.g., one of icons 234A–234E) in switch 214. If not, processing continues at step 902 to wait for another event.

If it is determined (at step 1202) that a button event occurred over a switch entry, processing continues at step 1204 to deactivate the current workspace's application(s). Activation of the new workspace's application(s) occurs at step 1206. At step 1208 the workspace windows are displayed in display area 224. Processing continues at step 902 to await another event.

Thus, a method and apparatus for accessing information and other items across workspaces has been provided.

I claim:

1. A method of accessing information across multiple workspaces displayed in a graphical user interface (GUI) executing in a computer system comprising the steps of:
    associating a first sliding panel with an application;
    defining in said GUI a first closed representation of said first sliding panel along an edge of said GUI and a second closed representation of a second sliding panel along said edge of said GUI;
    displaying an open representation of said first sliding panel in said GUI when a panel activation event occurs, output from said application being displayed in said open representation of said first sliding panel, said open representation of said first sliding panel remaining extended along said edge of said GUI while active, said first closed representation of said first sliding panel disappearing, said second closed representation of said second sliding panel remaining visible along said edge of said GUI.

2. The method of claim 1 further comprising the step of directing output from said multiple workspaces to said second portion of said GUI.

3. The method of claim 1 wherein said first portion of said GUI comprises the edges of said GUI.

4. The method of claim 3 further comprising the step of associating said sliding panel with one of said edges of said GUI.

5. The method of claim 4 wherein said GUI representation is a thin column along said one of said edges of said GUI.

6. The method of claim 4 wherein said open representation is a panel that extends along said one of said edges.

7. The method of claim 1 wherein said step of activating further comprises the steps of:
    determining whether another application is active;
    deactivating said another application when said another application is active;
    activating said application.

8. The method of claim 1 further comprising the step of deactivating said application when a panel deactivation event occurs.

9. The method of claim 8 wherein said panel deactivation event is the movement of a cursor outside said open representation of said sliding panel.

10. The method of claim 1 wherein said panel activation event is the movement of a cursor within said GUI representation.

11. The method of claim 1 wherein said panel activation event is keyboard input, said keyboard input comprising one or more keys.

12. A system comprising:
    a configuration module capable of generating a sliding panel configuration that includes a specification of an application to run in said sliding panel;
    a selector module coupled to said configuration module configured to manage a sliding panel across multiple workspaces;
    a GUI coupled to said selector module for displaying said sliding panel and a plurality of windows of one of said multiple workspaces, when said sliding panel is selected, said GUI including an open representation of said sliding panel remaining extended along an edge of said GUI while active and closed representations of deactivated sliding panels, a closed representation of said sliding panel disappearing from said GUI when said sliding panel is activated.

13. The system of claim 12 wherein said GUI further comprises a first portion in which said closed representation of said sliding panel is displayed and a second portion to display output from said multiple workspaces.

14. The system of claim 13 wherein said selector module is configured to open said application in said sliding panel when a panel activation event occurs.

15. The system of claim 14 wherein said selector module is configured to close said sliding panel and said application when a panel deactivation event occurs.

16. An article of manufacture comprising:
    a computer usable medium having computer readable program code embodied therein for accessing information across multiple workspaces displayed in a graphical user interface (GUI) of a computer system comprising:
    computer readable program code configured to cause a computer to associate a sliding panel with an application;
    computer readable program code configured to cause a computer to define in said GUI a first portion in which a GUI representation of said sliding panel is displayed and a second portion to display output from said multiple workspaces;

computer readable program code configured to cause a computer to activate said application when a panel activation event occurs, output from said application being displayed in an open representation of said sliding panel remaining extended along an edge of said GUI while active, said closed representation of said sliding panel disappearing from said GUI when said panel activation event occurs.

17. The article of manufacture of claim 16 further comprising computer readable program code configured to cause a computer to direct output from said multiple workspaces to said second portion of said GUI.

18. The article of manufacture of claim 16 wherein said first portion of said GUI comprises the edges of said GUI.

19. The article of manufacture of claim 18 further comprising computer readable program code configured to cause a computer to associate said sliding panel with one of said edges of said GUI.

20. The article of manufacture of claim 18 wherein said GUI representation is a thin column affixed to one of said edges of said GUI.

21. The article of manufacture of claim 18 wherein said open representation is a panel that extends out from said one of said edges.

22. The article of manufacture of claim 16 wherein said computer readable program code configured to cause a computer to activate further comprises:

computer readable program code configured to cause a computer to determine whether another application is active;

computer readable program code configured to cause a computer to deactivate said another application when said another application is active;

computer readable program code configured to cause a computer to activate said application.

23. The article of manufacture of claim 16 further comprising computer readable program code configured to cause a computer to deactivate said application when a panel deactivation event occurs.

* * * * *